Oct. 5, 1943.   C. P. HEGAN ET AL   2,331,028
AIR FILTER
Filed Jan. 23, 1942   2 Sheets-Sheet 1

CHESTER P. HEGAN,
JOHN P. STARKS, II
VERNER DAHLMAN
INVENTORS

BY Arthur F. Robert
ATTORNEY.

Oct. 5, 1943.  C. P. HEGAN ET AL  2,331,028
AIR FILTER
Filed Jan. 23, 1942  2 Sheets-Sheet 2

CHESTER P. HEGAN
JOHN P. STARKS, II
VERNER DAHLMAN,
INVENTORS

BY Arthur F. Robert
ATTORNEY

Patented Oct. 5, 1943

2,331,028

UNITED STATES PATENT OFFICE 2,331,028

AIR FILTER

Chester P. Hegan, John P. Starks, II, and Verner Dahlman, Louisville, Ky., assignors to American Air Filter Company, Inc., Louisville, Ky., a corporation of Delaware Application January 23, 1942, Serial No. 427,858

5 Claims. (Cl. 183—7)

This invention relates to improvements in electrostatic air filters of the general type disclosed in Patent No. 2,212,885 issued to H. W. Pound et al. on August 27, 1940.

Electrostatic filters of the type herein described usually embody an ionizer which imparts a positive charge to dust particles in the entering air, and a periodically moved curtain mounted to follow an elongated vertical path to form front and rear sections through which the air passes. The curtain includes a series of spaced alternate charged and grounded plates with films of viscous material such as oil thereon, the dust particles being collected on the grounded plates as the air passes between the plates. To provide the oil films, an oil bath is usually provided at the bottom turn of the curtain path. Each time the curtain passes through the liquid bath, the dirty film of oil is replaced by a clean film.

It is desirable to maintain the curtain elements charged only during their travel through the gas-cleaning section or air stream. This is accomplished by placing spring contact fingers or brushes on the curtain elements to contact bus bars extending across the path of the air stream and terminating adjacent the turns of the curtain, the relative positions of the bus bars and the brushes being such that the latter are under considerable tension when in contact with the bus bars. The end of each bus bar initially contacted by the brushes may be termed the make end, and the opposite end, the break end.

It has been noted at times that the filtering efficiency of the plate assemblies has been below what it normally should be. We have discovered that this lowering of efficiency is caused by a temporary drop in the voltage existing between the charged and uncharged plates of the plate assemblies which, in turn, is caused by delayed makes and breaks between the brushes and the bus bars at the make and break ends of the latter. When there is an extended make or break period, which corresponds to a poor connection, there is oftentimes a leakage of current. Such leakage is possible by reason of the fact that the plates, in emerging from the oil bath, pick up particles of lint, which operate to bridge the gaps between the plates and provide means for the passage of current. Lint may also be deposited on the plate by the air being filtered. The reduced voltage established between the plates is insufficient to blast the lint particles therefrom with the result that there will be a current leakage with a corresponding reduction in voltage throughout the system and a reduction in filtering efficiency. As the curtain elements are usually advanced periodically at intervals of about 12 minutes, it is obvious that one delayed or poor connection under such circumstances will reduce the efficiency of the filter for a time sufficient to permit the passage of considerable insufficiently filtered air therethrough.

A major object of this invention is to provide an electrostatic filter characterized by substantially uniform filtering efficiency.

A further object is the provision of novel means whereby the possibility of a leakage of current is eliminated, and the voltage between the plates of a filter of the type described is maintained substantially constant.

Still a further object is the provision of novel make and break connections between the brushes and the bus bars of a filter of the type described whereby the make and break connections therebetween are established substantially instantaneously and the possibility of a delayed make or break with an accompanying leakage of current is eliminated.

A preferred embodiment of the present invention is illustrated in the accompanying drawings wherein.

The present invention contemplates the provision of an electrostatic filter assembly wherein the voltage in the plate assemblies is maintained substantially constant, this being accomplished by the provision of instantaneous make and break connections between the bus bars and the brushes. In the embodiment described herein, each bus bar terminates at its break end in an abrupt edge, preferably formed at a right angle to the longitudinal axis of the bar. Relatively normally straight spring contact fingers or brushes are provided and angularly positioned relative to the contact faces of the bus bars. Each brush terminates in an edge substantially parallel to the face of the bus bar and springs rapidly from contact therewith and out of arcing distance when sliding off the break end of the bus bar. This invention further contemplates the provision of a neutral contact bar adjacent the make end of each bus bar whereby brushes are sprung or deflected immediately prior to their contact with the bus bar and are released with considerable force immediately adjacent the bus bar. Preferably the make end of the bus bar is slightly curved and the brush length and the distance of the release end of the contact bar from the bus bar so proportioned that upon leaving the contact bar, the major portion of each brush immediately springs into contact with the curved portion of the bus bar. The curve of the end of the bus bar is preferably the same as the shape assumed by each brush at the corresponding degree of deflection whereby relatively large surface areas of the two are brought rapidly into contact.

Figure 1:
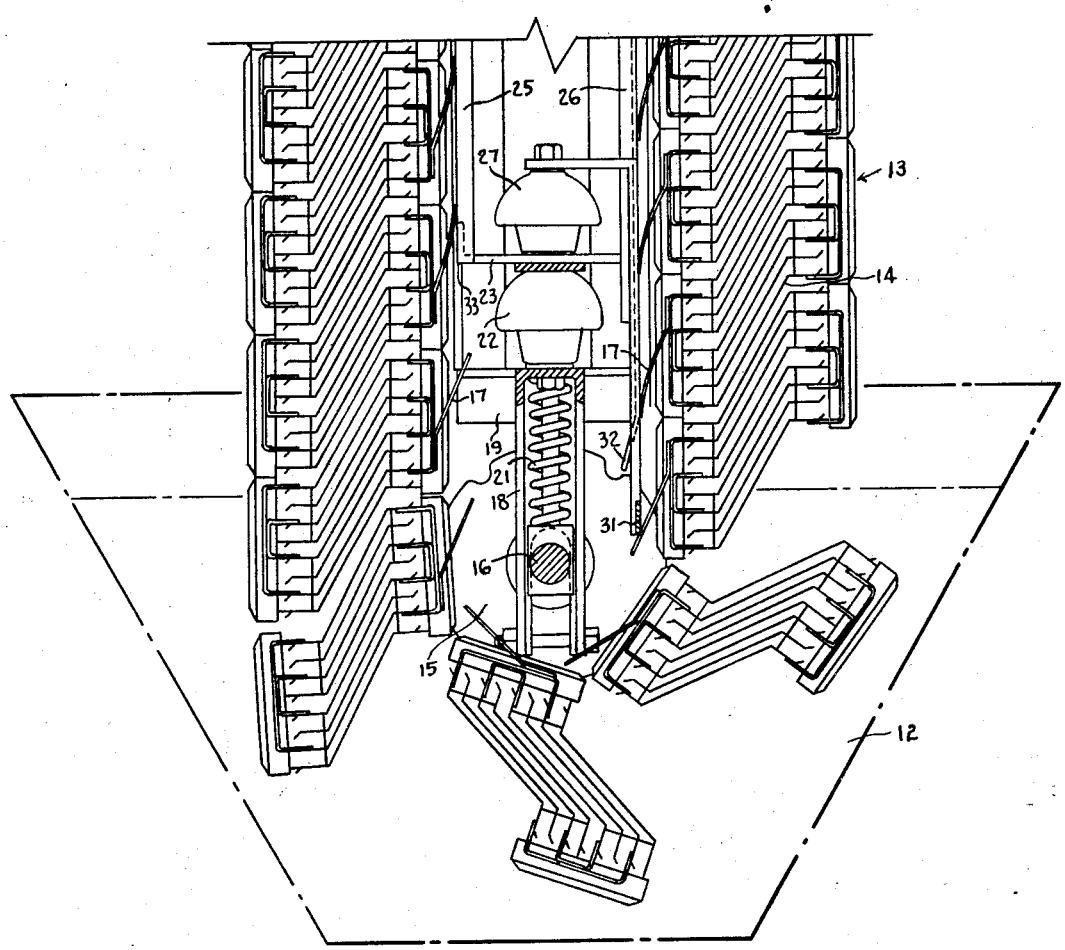
Figure 1 is a section through the lower portion of an air filter of the electrostatic type, the oil bath being shown in broken lines.
Figure 2:
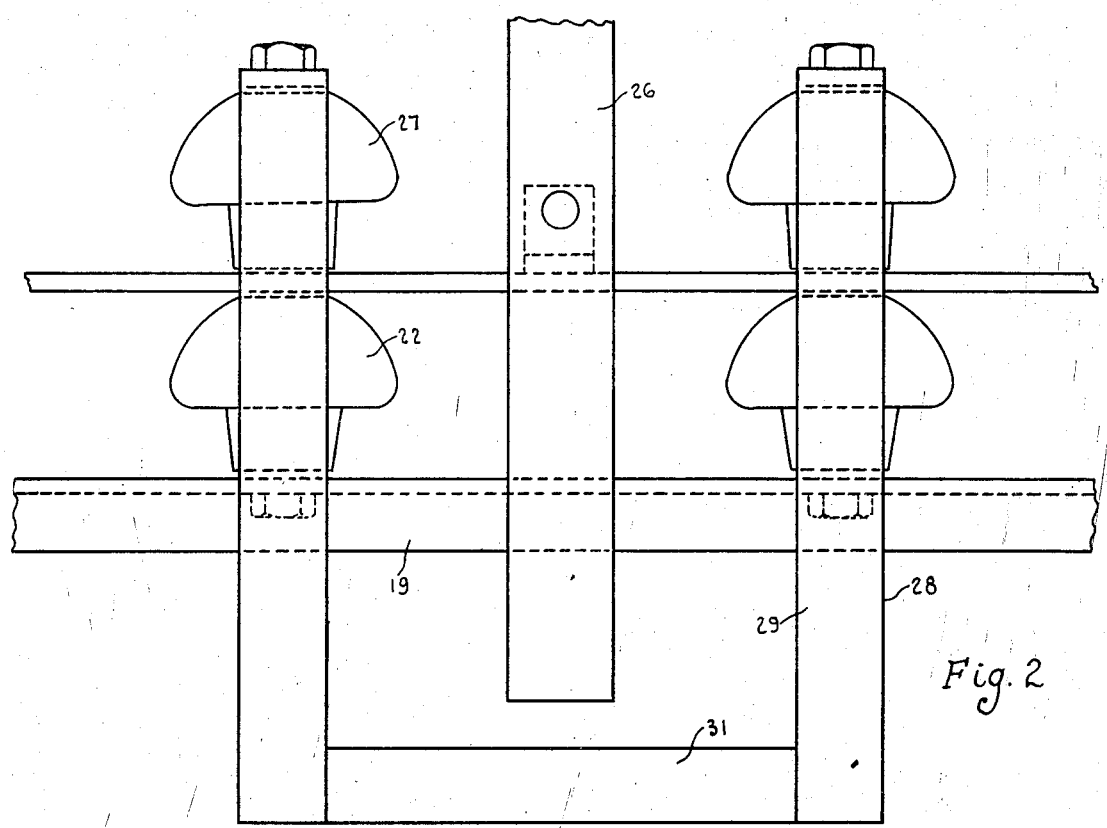
Figure 2 is a front elevation of the make assembly including the neutral contact bar which engages the brushes upon their approaching the air passage through the filter and insures their quick contact with the adjacent bus bar.
Figure 3:
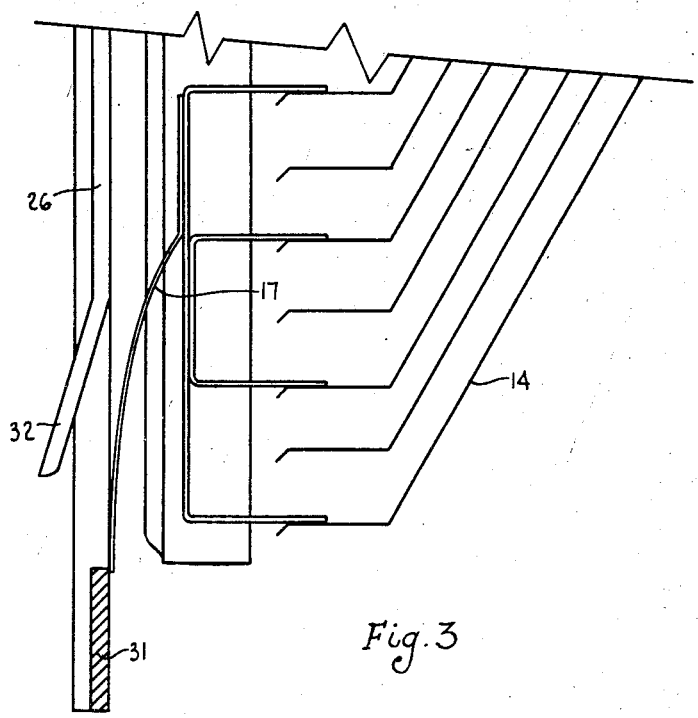
Figure 3 is a detail of a portion of Figure 1 illustrating a brush about to be released by the neutral contact bar for engagement with the adjacent bus bar.

Referring to Figure 1, the portion of the air filter there shown comprises an oil bath 12, a curtain 13 composed of individual sections of alternate charged and grounded plates 14 secured to a chain or other suitable connecting means and arranged to pass around sprocket 15 on a shaft 16, a duplicate shaft and sprocket assembly (not shown) being provided at the top of the filter. The curtain travels in a vertically elongated path and in a counter-clockwise direction as viewed in Figure 1, intermittent movement thereof being secured through suitable drive means. Each of the curtain sections is provided on its rear face with a spring contact finger or brush 17, preferably formed of phosphor bronze and secured as by welding or similar means. The extending portions of the brushes are at a considerable angle to the secured portions as shown at the lower portion of Figure 1 and the free ends preferably terminate on lines running at right angles to the longitudinal axes of the brushes.

Shaft 16 is slidably supported in a guide member 18 secured to a grounded channel 19, as through a spring assembly 21 to maintain the curtain under the desired tension. A plurality of insulators 22 are mounted atop channel 19 to support a charged member 23 having lugs 24 to support vertically extending bus bars 25 and 26. A plurality of insulators 27 are provided atop member 23 to support a generally U-shaped member 28 having legs 29 and a bight 31. The lower or make end of bus bar 26 is preferably curved inwardly at 32 for a purpose to be later described. The lower end of bus bar 25 terminates in an abrupt or sharp edge 33 which is preferably at a right angle to the longitudinal axis of the bar. It is to be understood that a like assembly is provided at the top of the curtain with the exception that no oil bath is there provided.

In operation as curtain 13 travels in a counter-clockwise direction as viewed in Figure 1, brushes 17 will break contact with bus bar 25 at the lower end 33 of the bus bar. Because of the resiliency of the brushes, their deflection by the bus bar, and the shapes of the ends of the bus bar and the brushes, an extremely rapid break is secured and the ends of the brushes rapidly fly out of arcing distance with the bus bar. This rapid break insures against any leakage of current with a consequent reduction of voltage in the plate assemblies.

No matter in what position the curtain may be periodically halted, there will be either a complete connection between the brush and the bus bar or no connection. There will never be what might be termed a poor or a delayed connection.

In emerging from the oil bath, each brush 17 first comes into contact with cross bar 31. As this bar is neutral, there is no arcing. In continuing its travel across the cross bar, the brush is sprung or deflected so that considerable force is stored therein. Upon leaving the upper edge of the cross bar, the brush is released with considerable force and rapidly flies into contact with the make end 32 of bus bar 26. By reason of the curvature of end 32 of the bus bar, and the position of the brush relative thereto, the bus bar and the brush contact over considerable surface area. This large contact area coupled with the rapid movement of the brush insures that the connection between the bus bar and the brush is made substantially instantaneously with no possibility of current leakage. Moreover the rapid movement of the brush coupled with its abrupt halt by the end of the bus bar insures that a considerable quantity of the oil collected on the brush during its travel through the oil bath will be thrown off, thereby making for a better connection between the bus bar and the brush.

Having described our invention, we claim:

1. An electrostatic cleaner comprising: a filter medium composed of an alternate series and an intermediate series of electrical precipitating elements arranged for periodic movement through gas cleaning and filter cleaning sections; means for establishing a precipitating field between adjacent elements in the gas cleaning section, said means including a stationary power-supply bus bar extending alongside the elements in the gas cleaning section and a series of resilient brushes carried by the alternate elements in position to make and break connection with the bar respectively as they approach and leave the gas cleaning section; and neutral means arranged adjacent the make end of the bar in position to obstruct the path of the approaching brushes, said means operating, as the brushes ride over it, to move each approaching brush in a direction away from the bar and to release it at a point where it snaps into firm engagement with the make end of the bar.

2. The improvement according to claim 1 wherein the neutral means comprises a bar spaced from the make end of each bus bar with its brush contacting surface substantially in line with the main brush contacting surface of the bus bar.

3. The improvement according to claim 1 wherein the make end of each bus bar is curved to conform to the shape of the correspondingly deflected brushes to simultaneously engage a relatively large portion of the surface area of each of the brushes when they are released from the neutral means.

4. The improvement according to claim 1 wherein the make end of each bus bar is curved and the length of each of the brushes and the space between the make end of the bus bar and the adjacent end of the neutral means is so proportioned that upon leaving the neutral means, the major portion of each brush immediately contacts the bus bar.

5. The cleaner defined in claim 1 wherein: the bus bar terminates at its break end in a relatively abrupt edge and each brush is provided with a strap-like resilient brush member having a similarly abrupt end and being normally straight but substantially flexed when in contact with the bus bar whereby, as the brushes ride off the bus bar they break contact with the bus bar abruptly and quickly spring beyond arcing distance therewith.

CHESTER P. HEGAN.
JOHN P. STARKS, II.
VERNER DAHLMAN.